(No Model.)
G. C. BROOKS.
AUTOMATIC FEEDING MACHINE FOR SAWING MATERIALS.
No. 579,948. Patented Apr. 6, 1897.
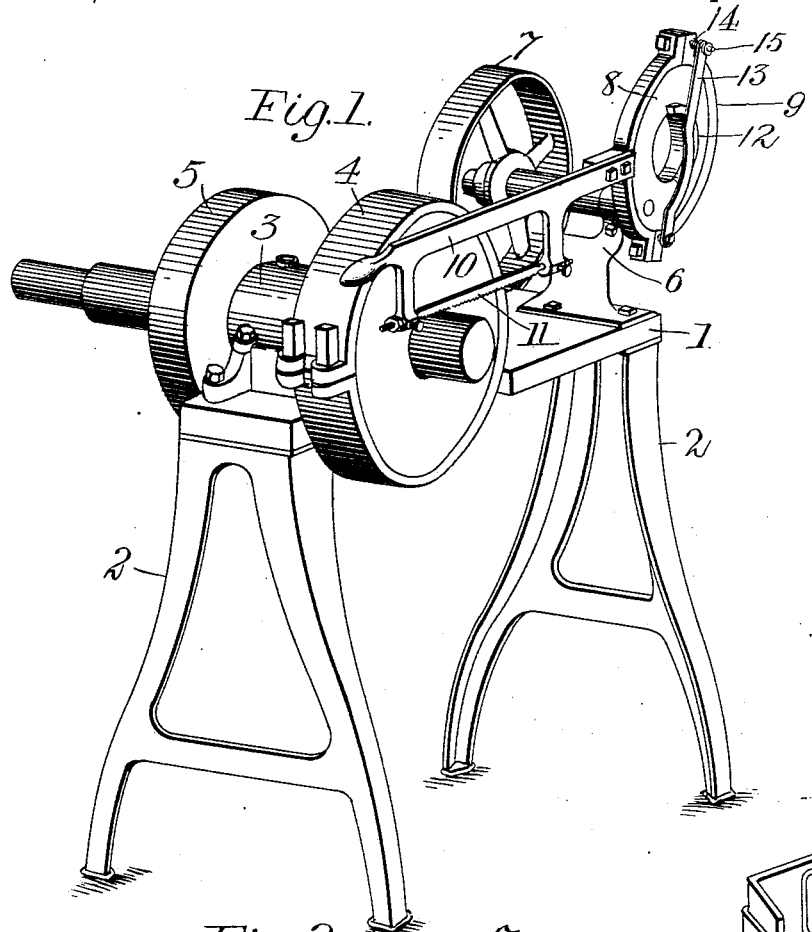
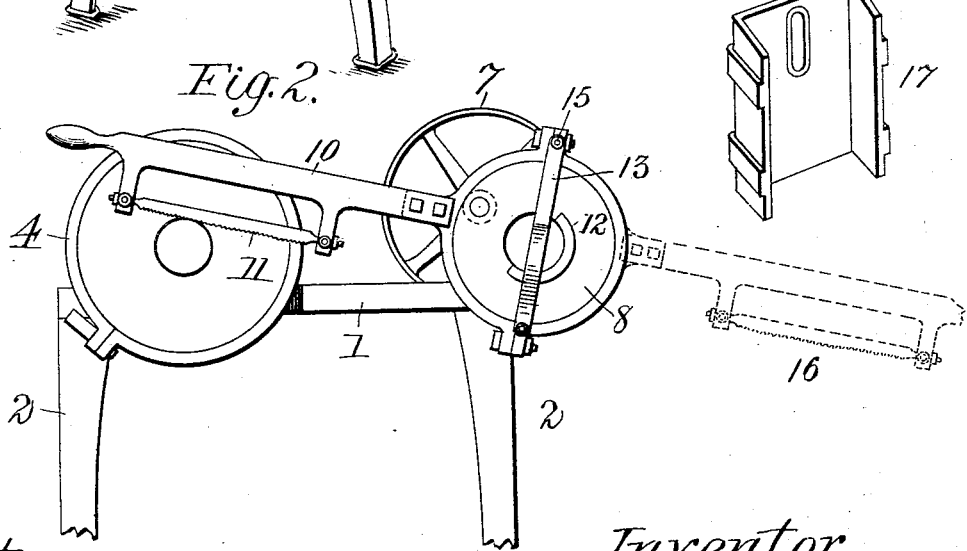
Witnesses:
James C Brand
Rolland P. Smart
Inventor
George C. Brooks

UNITED STATES PATENT OFFICE.

GEORGE C. BROOKS, OF BINGHAMTON, NEW YORK.

AUTOMATIC FEEDING-MACHINE FOR SAWING MATERIALS.

SPECIFICATION forming part of Letters Patent No. 579,948, dated April 6, 1897.

Application filed November 4, 1896. Serial No. 611,080. (No model.)

*To all whom it may concern:*

Be it known that I, GEORGE C. BROOKS, a citizen of the United States, residing at No. 2 Munsell street, in the city of Binghamton, county of Broome, and State of New York, have invented a new and useful Oscillating and Rotating and Automatic Feeding-Machine for Sawing Materials, of which the following is a specification.

In the drawings, Figure 1 is a perspective view of my invention. Fig. 2 is a side view thereof, and Fig. 3 is a perspective view of another form of chuck.

My invention relates to improvements in machines for sawing materials, more in particular metals; and it consists of a bed-plate 1, which may be mounted upon a suitable standard or legs 2, in order to bring it to a proper height. Upon a certain portion of said bed-plate I arrange a suitable box or housing 3, so secured that the same may be removable at will and capable of necessary adjustment. Within said housing a suitable hollow shaft or spindle is arranged in such a manner as will permit it to revolve therein. A suitable chuck 4 is so secured to said spindle that it will revolve therewith, said chuck and spindle being adapted to hold the material or metal during the operation of sawing said material or metal, and the rotation of the same is accomplished by means of the pulley-wheel 5, adapted to receive a belt, which is secured to the spindle. I may employ any common means for imparting a rotary motion to said spindle and chuck and a material or metal contained therein without departing from the spirit of my invention. Upon another portion of the bed-plate 1 I arrange another housing or box 6, containing a revoluble shaft and means for imparting rotary motion to said shaft and the part secured thereto, which may consist of the pulley 7 or any other common means.

At a certain portion of the shaft or spindle I secure the eccentric 8 in such a manner that the rotation of the shaft or spindle will revolve said eccentric within the eccentric-strap 9, and thus impart oscillating motion to the frame 10 and the saw 11, contained therein. Upon the face of the eccentric 8 is arranged a cam 12, designed to come in contact with a plate 13, secured to the eccentric-strap in such a manner that will cause the saw 11 to be borne down upon the metal being operated upon and thus create a pressure upon the same at that portion of the movement of said saw when the cutting of the metal is effected.

Near the lower end of plate 13 is a slight curve, to allow the passage of the cam 12 under the said plate 13 without interference, thus throwing the pressure on the saw at its forward stroke and releasing said pressure at the return stroke. It is obvious that the cam 12 or the plate 13 may be constructed on a slight taper to allow an easy entrance of the cam 12 under the plate 13.

The pressure of the saw upon the metal or material may be adjusted by regulating the degree of friction between the cam 12 and the plate 13, which is accomplished by means of the spring 14, the tendency of which is to force the plate 13 from said cam 12, and the screw 15, capable of being turned in such a manner as will bring the plate 13 into sufficient contact with the cam 12 to create the requisite pressure upon the saw.

The frame 10 is secured to the eccentric-strap by the two bolts shown at the right end of the frame 10 in Fig. 2. When it is desired by the operator to saw metal in the rear of the machine, this may be done by taking out the two bolts above referred to and turning the frame and replacing the bolts in their former position. The saw will then be uppermost. The frame is now in a correct position for sawing at the rear of the machine. It is obvious that another pair of supporters or legs on frame 10 for supporting the saw could be cast and thus avoid the trouble and delay of turning over the frame 10.

The above combination and arrangement of parts is adapted more particularly for the cutting of round metals, and the advantage of such arrangement lies in the fact that during the operation of sawing the metal being operated upon is revolved in the opposite direction of the cutting motion of the saw, and when the saw completes its cutting stroke it returns upon the metal. It is evident that by revolving the metal the cutting begins at the periphery, and when the saw reaches the axis of the revolving metal the piece is completely severed and no objectionable bur is left upon the surface, as is the case where the metal upon which the saw operates does not revolve.

When it is desired to saw metals square or rectangular in sections, the chuck 17 may be secured to the bed-plate in lieu of housing or box 3 and the parts contained therein. Said chuck 17 may be secured in any common manner that will enable it to be fixed at any desired angle with relation to the path of motion of the saw. The metal may be secured within the chuck 17 by means of set-screws or in any common manner.

This completes the construction of my invention, whose operation is as follows: The pulley 7 is connected by a belt with another revolving pulley in order to, at the will of the operator, rotate the same and the parts connected therewith in such a direction that the portion of the metal being cut moves in an opposite direction to the cutting stroke of the saw. The pulley 5 is connected in a like manner to cause the same and the parts connected therewith, at the will of the operator, to move in the direction of the metal during the cutting stroke of the saw. The metal to be operated upon is then secured within the chuck and spindle. The desired pressure of the plate 13 upon the cam 12 is adjusted by means of the spring 14 and screw 15, as hereinbefore described. The saw is now placed upon the metal, when motion may be imparted to the saw and the metal, as previously set forth.

Having thus described my invention, what I claim as new, and desire to secure by Letters Patent of the United States, is—

1. In a machine of the kind described the combination of the bed-plate having mounted thereon the revoluble chuck; the means for revolving the same; the saw; the frame containing the saw; the eccentric arranged to impart an oscillating motion to said saw; the cam contained thereon, and the plate arranged upon the eccentric substantially as and for the purpose described.

2. In a machine of the kind described, a combination of the bed-plate having mounted thereon a revoluble chuck; the means for revolving the same; the saw; the frame containing said saw; the eccentric arranged to impart an oscillating motion to said saw; the cam contained thereon; the plate arranged upon the eccentric-strap, and the spring and screw connected therewith substantially as and for the purpose described.

GEORGE C. BROOKS.

Witnesses:
ROLLAND P. SMITH,
J. C. BEARD.